US012651821B2

(12) United States Patent
Morimoto et al.

(10) Patent No.: US 12,651,821 B2
(45) Date of Patent: Jun. 9, 2026

(54) FEEDING STRUCTURE, PLATE-SHAPED BODY, AND WINDOW GLASS

(71) Applicant: AGC Inc., Tokyo (JP)

(72) Inventors: Yasuo Morimoto, Tokyo (JP); Fuminori Watanabe, Tokyo (JP); Ryota Okuda, Tokyo (JP); Kiyoshi Nobuoka, Tokyo (JP); Hideaki Shoji, Tokyo (JP)

(73) Assignee: AGC INC., Tokyo (JP)

( * ) Notice: Subject to any disclaimer, the term of this patent is extended or adjusted under 35 U.S.C. 154(b) by 114 days.

(21) Appl. No.: 18/665,960

(22) Filed: May 16, 2024

(65) Prior Publication Data

US 2024/0304980 A1 Sep. 12, 2024

Related U.S. Application Data

(63) Continuation of application No. PCT/JP2022/041889, filed on Nov. 10, 2022.

(30) Foreign Application Priority Data

Nov. 19, 2021 (JP) ................................ 2021-188889

(51) Int. Cl.
*H01Q 1/12* (2006.01)
*H01P 5/08* (2006.01)
*H01Q 1/27* (2006.01)

(52) U.S. Cl.
CPC ............ *H01Q 1/1285* (2013.01); *H01P 5/08* (2013.01); *H01Q 1/27* (2013.01)

(58) Field of Classification Search
CPC ...... H01Q 1/1285; H01Q 1/27; H01Q 1/1271; H01P 5/08; H01P 3/085
See application file for complete search history.

(56) References Cited

U.S. PATENT DOCUMENTS 5,760,744 A 6/1998 Sauer
9,171,658 B2 10/2015 Reul et al.
(Continued)

FOREIGN PATENT DOCUMENTS

JP 2010-070414 A 4/2010
JP 2014-116298 A 6/2014
(Continued)

OTHER PUBLICATIONS

Kouchi et al., "The Wireless Feeding Flexible Printed Circuit Which is Available for the Curved Surface Mount", SEI Technical Review, No. 80, Apr. 2015, pp. 26-29.
(Continued)

*Primary Examiner* — Regis J Betsch
*Assistant Examiner* — Jose A. Miranda Gonzalez
(74) *Attorney, Agent, or Firm* — Foley & Lardner LLP

(57) ABSTRACT

There is provided a simple configuration capable of feeding power to a conductor present between a pair of dielectric plates.

A feeding structure including a first dielectric plate; a second dielectric plate that faces the first dielectric plate; an interlayer that is disposed between the first dielectric plate and the second dielectric plate; a conductor that is disposed between the first dielectric plate and the second dielectric plate; a feeding portion that is disposed on a side opposite of the interlayer from the first dielectric plate and that sandwiches at least one of a portion of the interlayer and a portion of the second dielectric plate between the conductor and the feeding portion; and a first transmission line that is connected to the feeding portion, wherein the feeding portion electromagnetically couples to the conductor with a gap smaller than a thickness of the first dielectric plate.

19 Claims, 13 Drawing Sheets

(56) References Cited

U.S. PATENT DOCUMENTS

| | | | | |
|---|---|---|---|---|
| 2007/0216589 | A1* | 9/2007 | Li | H01Q 1/1271 343/711 |
| 2017/0033433 | A1 | 2/2017 | Winkelmann et al. | |
| 2021/0028531 | A1 | 1/2021 | Dardenne et al. | |
| 2021/0339503 | A1 | 11/2021 | Ogawa | |
| 2022/0059948 | A1 | 2/2022 | Sayama et al. | |

FOREIGN PATENT DOCUMENTS

| | | | | |
|---|---|---|---|---|
| JP | 2014-514836 A | | 6/2014 | |
| JP | 2014140088 A | * | 7/2014 | H01Q 1/3233 |

OTHER PUBLICATIONS

International Searching Authority, "International Search Report," issued in connection with International Patent Application No. PCT/JP2022/041889, dated Jan. 24, 2023.

International Searching Authority, "Written Opinion," issued in connection with International Patent Application No. PCT/JP2022/041889, dated Jan. 24, 2023.

* cited by examiner

FEEDING STRUCTURE, PLATE-SHAPED BODY, AND WINDOW GLASS

This application is a continuation of PCT Application No. PCT/JP2022/041889, filed on Nov. 10, 2022, which is based upon and claims the benefit of priority from Japanese Patent Application No. 2021-188889 filed on Nov. 19, 2021. The contents of those applications are incorporated herein by reference in their entireties.

TECHNICAL FIELD

The present disclosure relates to a feeding structure, a plate-shaped body, and a window glass.

BACKGROUND ART

A structure that feeds power by a flat conductor to an antenna structure body installed inside a composite glass plate has been known (see Patent Document 1 for example) in the related art.

PRIOR ART DOCUMENTS

Patent Documents

Patent Document 1: JP-A-2014-514836

DISCLOSURE OF INVENTION

Technical Problem

However, the feeding structure in the related art is configured such that the flat conductor is drawn out from a peripheral edge of the composite glass plate and thus has a likelihood of causing wiring in the vicinity of the peripheral edge of the composite glass to be complicated.

The present disclosure provides a simple configuration capable of feeding power to a conductor present between a pair of dielectric plates.

Solution to Problem

The present disclosure provides a feeding structure including:

- a first dielectric plate;
- a second dielectric plate that faces the first dielectric plate;
- an interlayer that is disposed between the first dielectric plate and the second dielectric plate;
- a conductor that is disposed between the first dielectric plate and the second dielectric plate;
- a feeding portion that is disposed on a side opposite of the interlayer from the first dielectric plate and that sandwiches at least one of a portion of the interlayer and a portion of the second dielectric plate between the conductor and the feeding portion; and
- a first transmission line that is connected to the feeding portion,
- wherein the feeding portion electromagnetically couples to the conductor with a gap smaller than a thickness of the first dielectric plate.

The present disclosure also provides a plate-shaped body that includes the feeding structure, and a window glass that includes the feeding structure.

Advantageous Effects of Invention

According to the present disclosure, it is possible to provide a simple configuration capable of feeding power to a conductor present between a pair of dielectric plates.

DESCRIPTION OF EMBODIMENTS

Figure 1:
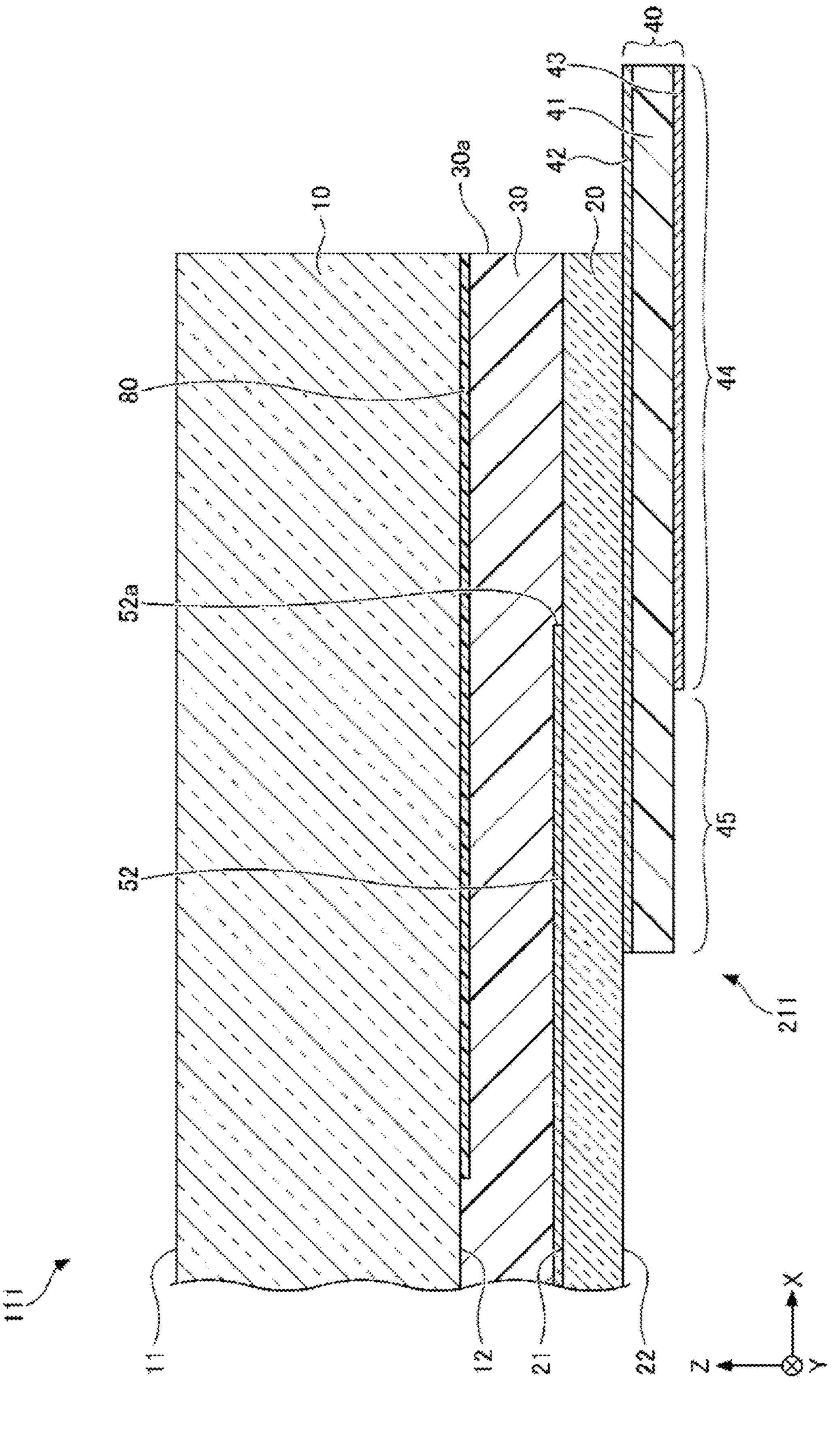
FIG. 1 is a partial cross sectional view illustrating an example of the configuration of a plate-shaped body including a feeding structure in a first embodiment.

An embodiment of the present disclosure will now be described below with reference to the drawings. For easy understanding of the embodiment, the scales of the individual elements in the drawings discussed in the embodiment may be represented differently from those of the actual elements. Terms representing directions, such as "parallel", "at right angles", "perpendicular", "horizontal", "vertical", "top-bottom", and "left-right", are not necessarily to be interpreted in an exact sense, and a certain range of deviation is allowed as long as the operations and the effects of the embodiment are not impaired. The X axis direction, the Y axis direction and the Z axis direction respectively represent a direction parallel to the X axis, a direction parallel to the Y axis and a direction parallel to the Z axis. The X axis direction, the Y axis direction and the Z axis direction are orthogonal to one another. The XY plane, the YZ plane and the ZX plane respectively represent an imaginary plane parallel to the X axis direction and the Y axis direction, an imaginary plane parallel to the Y axis direction and the Z axis direction and an imaginary plane parallel to the Z axis direction and the X axis direction.

FIG. 1 is a partial cross sectional view illustrating an example of the configuration of a plate-shaped body including a feeding structure in a first embodiment. A plate-shaped body 111 illustrated in FIG. 1 includes a feeding structure 211 that feeds power to a conductor 52 present between a pair of dielectric plates 10 and 20. The plate-shaped body 111 is a layered body that includes the pair of dielectric plates 10 and 20.

The pair of dielectric plates 10 and 20 are plate-shaped members that contain a dielectric as a main component. One or both of the pair of dielectric plates 10 and 20 may be each a glass plate. For example, when the dielectric plate 10 is a glass plate, the dielectric plate 20 may be a dielectric plate that differs from a glass plate, and, when the dielectric plate 20 is a glass plate, the dielectric plate 10 may be a dielectric plate that differs from a glass plate. When both of the pair of dielectric plates 10 and 20 are glass plates, the plate-shaped body 111 is also referred to as a laminated glass. In addition, when both of the pair of dielectric plates 10 and 20 are glass plates, these dielectric plates may be glass plates whose compositions are the same or glass plates whose compositions are different.

The plate-shaped body 111 is, for example, a window glass for a vehicle. Examples of the window glass for a vehicle include a windshield fixed to the front side of a vehicle, a rear glass fixed to the rear side of a vehicle, a side glass fixed to the lateral sides of a vehicle, and a roof glass fixed to the ceiling of a vehicle. The window glass for a vehicle according to the present embodiment is not limited to these examples.

The plate-shaped body 111 is a layered body that includes the pair of dielectric plates 10 and 20, an interlayer 30, and the conductor 52. The feeding structure 211 shares, with the plate-shaped body 111, the pair of dielectric plates 10 and 20, the interlayer 30, and the conductor 52. The feeding structure 211 includes the pair of dielectric plates 10 and 20, the interlayer 30, the conductor 52, a feeding portion 45, and a transmission line 44.

The dielectric plate 10 is an example of a first dielectric plate. The dielectric plate is a plate-shaped dielectric that has a main surface 11 facing the positive side in the Z-axis direction and a main surface 12 facing a side opposite from the main surface 11 in the Z-axis direction (the negative side in the Z-axis direction). The dielectric plate 10 may be transparent or translucent. When the plate-shaped body 111 is a window glass for a vehicle, the main surface 11 is a surface on the vehicle exterior side, and the main surface 12 is a surface on the vehicle interior side.

The dielectric plate 20 is an example of a second dielectric plate facing the first dielectric plate. The dielectric plate 20 is disposed on the side of the main surface 12 of the dielectric plate 10. The dielectric plate 20 is a plate-shaped dielectric that has a main surface 21 facing the positive side in the Z-axis direction and a main surface 22 facing a side opposite from the main surface 21 in the Z-axis direction. The dielectric plate 20 may be transparent or translucent. When the plate-shaped body 111 is a window glass for a vehicle, the main surface 21 is a surface on the vehicle exterior side, and the main surface 22 is a surface on the vehicle interior side.

The interlayer 30 is a transparent or translucent dielectric disposed between the dielectric plate 10 and the dielectric plate 20. The dielectric plate 10 and the dielectric plate 20 are bonded to each other by the interlayer 30. Examples of a material that constitutes the interlayer 30 include thermoplastic polyvinyl butyral (PVB), an ethylene/vinyl acetate copolymer (EVA) and a cycloolefin polymer (COP). Preferably, the relative dielectric constant of the interlayer 30 is 2.4 or more and 3.5 or less.

The plate-shaped body 111 may have a light-shielding film 80 at at least one of the main surface 12, the main surface 21, and the main surface 22. For example, the light-shielding film 80 may be disposed to have a predetermined width from an end portion (an end portion 30*a* of the interlayer 30) of the plate-shaped body 111. When the plate-shaped body 111 is a window glass for a vehicle, the light-shielding film 80 may be disposed at a peripheral edge portion of the window glass for a vehicle. In this case, the inner edge of the light-shielding film 80 corresponds to the outer edge of an opening (transmission region) of the window glass for a vehicle. The light-shielding film 80 is an opaque colored ceramic layer having a thickness of about 5 μm to 25 μm. The color of the light-shielding film 80 is optional and is preferably a dark color such as black, brown, grey or dark blue, or white, and more preferably black. When the plate-shaped body 111 has the light-shielding film 80, the transmission line 44, the feeding portion 45, and the conductor 52, which are described later, are less likely to be visually recognized, by the light-shielding film 80 overlapping at least part of the transmission line 44, the feeding portion 45, and the conductor 52.

The conductor 52 is a linear or planar conductor that is disposed between the dielectric plate 10 and the dielectric plate 20. Specific examples of the conductor 52 include a signal line, an antenna element and an electrode. In FIG. 1, an example in which the conductor 52 is formed at the main surface 21 of the dielectric plate 20 is illustrated. For example, the conductor 52 is formed at a conductive film formed by coating on the main surface 21 by vapor-deposition on the main surface 21.

The feeding portion 45 is a portion that is disposed on a side opposite of the interlayer 30 from the dielectric plate 10 and that sandwiches a part of the dielectric plate 20 between the conductor 52 and the portion. The transmission line 44 is an example of a first transmission line and is connected to the feeding portion 45. In this example, the feeding portion 45 and the transmission line 44 are formed at a substrate 40.

The substrate 40 is a plate-shaped component that has a main surface parallel to the XY plane. The substrate 40 includes a dielectric layer 41 that containing a dielectric as a main component, a signal line 42 formed at a surface of the dielectric layer 41 on the positive side in the Z-axis direction of the dielectric layer 41, and a ground layer 43 formed at a surface on the negative side in the Z-axis direction of the dielectric layer 41. The substrate 40 may be a flexible substrate or a rigid substrate.

The transmission line 44 is formed by at least the dielectric layer 41, the signal line 42, and the ground layer 43. The transmission line 44 transmits a high-frequency signal. The feeding portion 45 is connected to one end portion of the transmission line 44. To the other end portion of the transmission line 44, for example, a communication device, which is not illustrated is electrically connected. Specific examples of the transmission line 44 include a microstrip line, a strip line, a coplanar waveguide, a GCPW (grounded coplanar waveguide), a coplanar strip, a slot line and a waveguide pipe.

The transmission line 44 may be a coaxial cable. For example, an inner conductor of the coaxial cable is connected at an end portion of the coaxial cable to a connector provided at the feeding portion 45.

The feeding portion 45 has the dielectric layer 41 having a conductor portion (hereinafter also referred to as "facing conductor") facing the conductor 52 on the positive side in the Z-axis direction. The facing conductor of the feeding portion 45 is connected to an end portion of the signal line 42 of the transmission line 44. The facing conductor of the feeding portion 45 protrudes from an end of the ground layer 43 in plan view in the Z-axis direction. The facing conductor of the feeding portion 45 is, for example, a linear conductor formed at a surface of the dielectric layer 41, and may be a single line segment and may be bent. The facing conductor of the feeding portion may be a planar conductor formed at a surface of the dielectric layer 41.

The feeding portion 45 electromagnetically couples to the conductor 52 with a gap smaller than the thickness of the dielectric plate 10 in the Z-axis direction. The conductor 52 and the facing conductor of the feeding portion 45 are placed proximate to each other with a distance that enables electromagnetic coupling therebetween, and the feeding portion 45 thus feeds power contactlessly to the conductor 52, which is enclosed between the pair of dielectric plates 10 and 20, by electromagnetic coupling. It is possible to achieve the feeding structure 211 that is simple and that is capable of feeding power, even when the dielectric plate 20 is interposed between the conductor 52 and the feeding portion 45, to the conductor 52 present between the pair of dielectric plates 10 and 20 by feeding power contactlessly by electromagnetic coupling. In addition, with the feeding structure 211, it is possible, even when an end portion 52*a* of the conductor 52 is present inside the end portion 30*a* of the interlayer 30 (the negative side in the X-axis direction), to feed power from the feeding portion 45 to the conductor 52 in the Z-axis direction by a simple structure.

The distance that enables electromagnetic coupling is, for example, 500 μm or less, preferably 250 μm or less, more preferably 150 μm or less, furthermore preferably 100 μm or less, and most preferably 50 μm or less. In FIG. 1, the distance that enables electromagnetic coupling is substantially equal to the thickness of the dielectric plate 20 in the Z-axis direction.

When the plate-shaped body 111 is a window glass for a vehicle, it is preferable that the dielectric plate 10 (glass plate 10) be thicker than the dielectric plate 20 (glass plate 20). In this case, the thickness of the glass plate 10 may be, for example, about 3.2 mm. While a composition of the material that constitutes the dielectric plate 20 (glass plate 20) is selectable as appropriate, tempered glass is preferably used as a glass plate having a thickness that enables electromagnetic coupling described above and having a predetermined strength. Examples of the tempered glass include thermally tempered glass and chemically tempered glass. When the plate thickness of the tempered glass is thin, it is preferable to use chemically tempered glass. When the glass plate 20 is chemically tempered glass, preferably, the glass plate 20 has a composition that can be formed and strengthened by chemical tempering treatment. Examples of the glass plate for which chemical tempering treatment can be performed include aluminosilicate glass, soda lime glass, borosilicate glass, lead glass, alkali barium glass and alumino-borosilicate glass.

Since the feeding structure 211 feeds power through contactless feeding by electromagnetic coupling, the feeding structure 211 is suitable for feeding power to the conductor 52 through which a high-frequency signal having a frequency in a relatively high band passes. For reducing a loss of the high-frequency signal, it is preferable that the dielectric plate 20 (glass plate 20) has a low dielectric tangent (tan δ). For example, the tan δ of the glass plate 20 at a frequency of 10 GHz is preferably 0.010 or less, more preferably 0.009 or less.

For example, the conductor 52 or an antenna (for example, an antenna 70 described later) connected to the conductor 52 is formed to be able to transmit and receive radio waves in a predetermined frequency band. The predetermined frequency band is a relatively high band such as UHF (Ultra High Frequency) band in a range of from 300 MHz to 3 GHZ, SHF (Super High Frequency) band in a range of from 3 GHz to 30 GHz, or EHF (Extremely High Frequency) band in a range of from 30 GHZ to 300 GHz. Specific examples of such a high-frequency band include a band (a frequency band (sub6) of 6 GHz or lower and a frequency band of 24 GHz or higher (28 GHz band, 39 GHz band, and the like)) used for the fifth generation telecommunication (5G) standard.

A wavelength of a radio wave transmitted and received through the conductor 52 or an antenna (for example, the antenna 70 described later) connected to the conductor 52 in air is represented by λ, and a wavelength shortening rate of a peripheral medium of the feeding portion 45 is represented by k. Here, when the facing conductor of the feeding portion 45 is a linear conductor having a line length L of λ/4, electromagnetic coupling to the conductor 52 is strengthened, and a loss due to contactless feeding is suppressed. For example, from the point of view of suppression of a loss due to contactless feeding, $$0.80 \times k \times \lambda/4 \leq L \leq 1.20 \times k \times \lambda/4$$

is satisfied, $$0.90 \times k \times \lambda/4 \leq L \leq 1.10 \times k \times \lambda/4$$

is preferably satisfied, and $$0.95 \times k \times \lambda/4 \leq L \leq 1.05 \times k \times \lambda/4$$

is more preferably satisfied.

Figure 2:
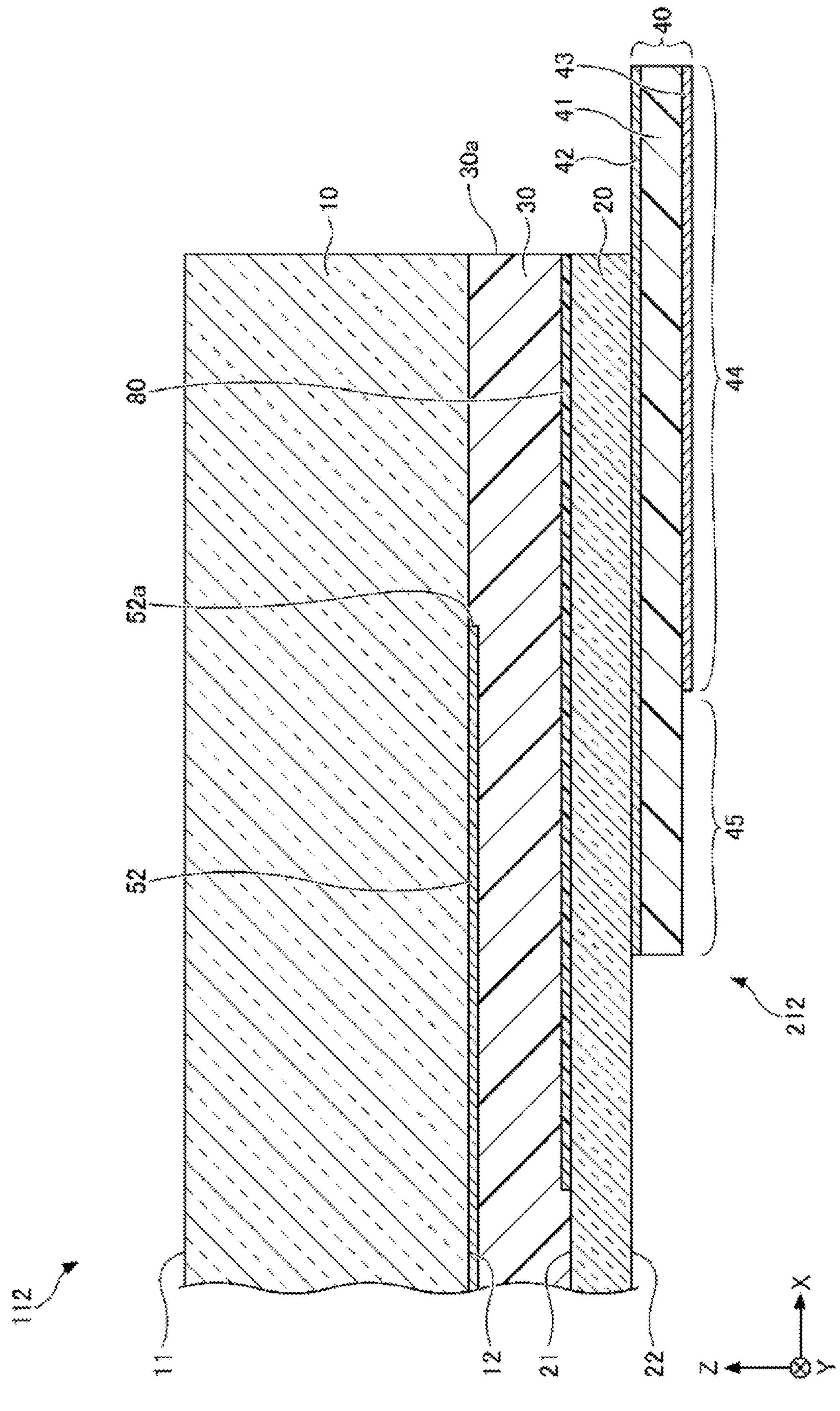
FIG. 2 is a partial cross sectional view illustrating an example of the configuration of a plate-shaped body including a feeding structure in a second embodiment.

FIG. 2 is a partial cross sectional view illustrating an example of the configuration of a plate-shaped body including a feeding structure in a second embodiment. Description of the components, actions and effects in the second embodiment similar to those in the first embodiment described above is omitted or simplified by citing the description of the first embodiment. A plate-shaped body 112 illustrated in FIG. 2 includes a feeding structure 212 that feeds power to the conductor 52 present between the pair of dielectric plates 10 and 20.

In FIG. 2, an example in which the conductor 52 is formed at the main surface 12 of the dielectric plate 10 is illustrated. For example, the conductor 52 is formed at a conductive film that formed by coating on the main surface 12 by vapor-deposition on the main surface 12. In this example, the feeding portion 45 is a portion that sandwiches a part of the interlayer 30 and a part of the dielectric plate 20 between the conductor 52 and the portion.

The feeding portion 45 electromagnetically couples to the conductor 52 with a gap smaller than the thickness of the dielectric plate 10 in the Z-axis direction and feeds power contactlessly to the conductor 52 by electromagnetic coupling. Consequently, it is possible to achieve the feeding structure 212 that is simple and that is capable of feeding power, even when the interlayer 30 and the dielectric plate 20 are interposed between the conductor 52 and the feeding portion 45, to the conductor 52 present between the pair of dielectric plates 10 and 20. In FIG. 2, the distance that enables electromagnetic coupling is substantially equal to the sum of the thickness of the interlayer 30 in the Z-axis direction and the thickness of the dielectric plate 20 in the Z-axis direction.

Figure 3:
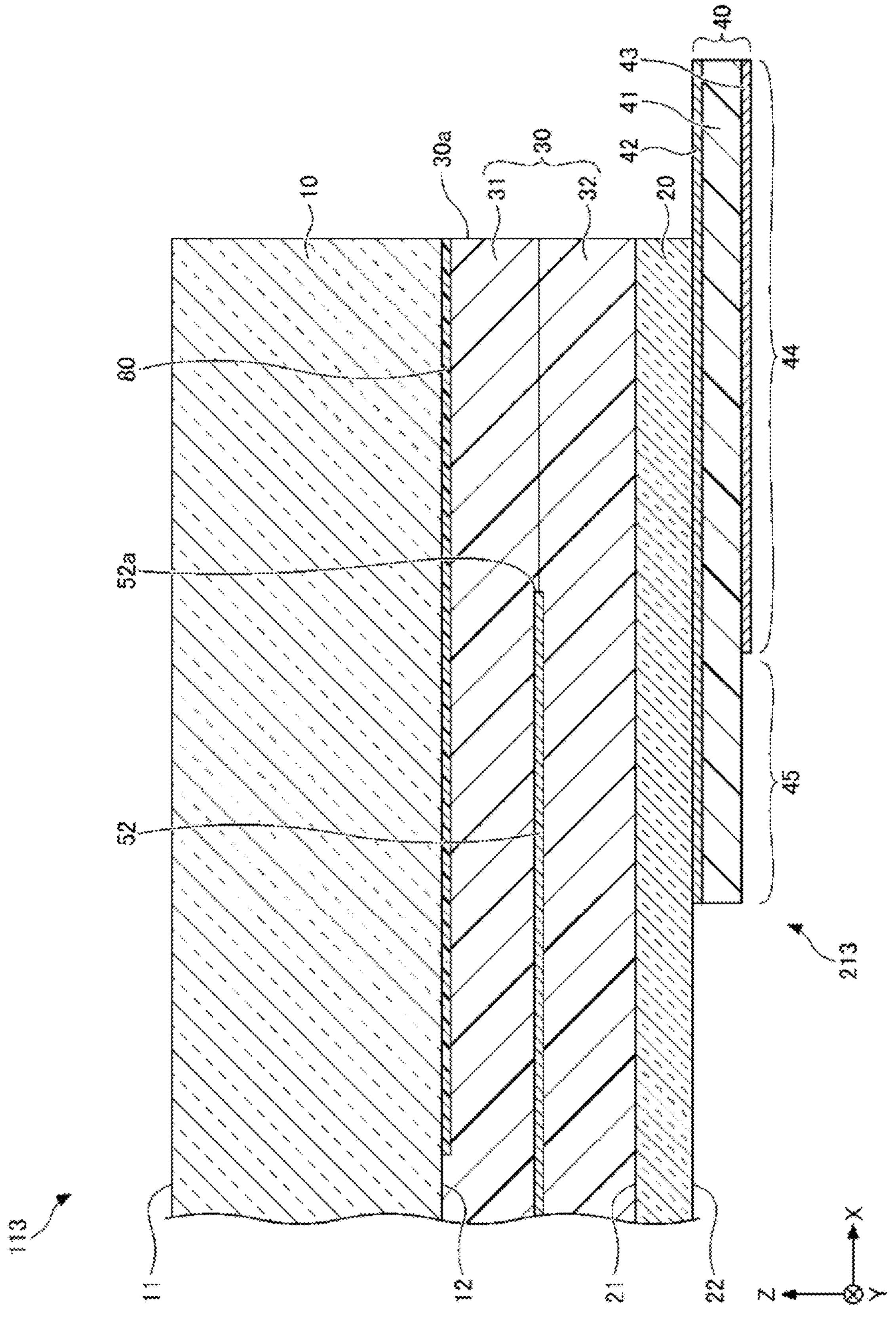
FIG. 3 is a partial cross sectional view illustrating an example of the configuration of a plate-shaped body including a feeding structure in a third embodiment.

FIG. 3 is a partial cross sectional view illustrating an example of the configuration of a plate-shaped body including a feeding structure in a third embodiment. Description of the components, actions and effects in the third embodiment similar to those in the embodiments described above is omitted or simplified by citing the description of the embodiments described above. A plate-shaped body 113 illustrated in FIG. 3 includes a feeding structure 213 that feeds power to the conductor 52 present between the pair of dielectric plates 10 and 20.

In FIG. 3, an example in which the conductor 52 is sandwiched between an interlayer 31 and an interlayer 32 is illustrated. The interlayer 31 is an example of a first interlayer included in the interlayer 30. The interlayer 32 is an example of a second interlayer included in the interlayer 30. For example, the conductor 52 is disposed to be sandwiched between the interlayer 31 in contact with the main surface 12 of the dielectric plate 10 and the interlayer 32 in contact with the main surface 21 of the dielectric plate 20. In this example, the feeding portion 45 is a portion that sandwiches a part of the interlayer 32 and a part of the dielectric plate 20 between the conductor 52 and the portion.

The feeding portion 45 electromagnetically couples to the conductor 52 with a gap smaller than the thickness of the dielectric plate 10 in the Z-axis direction and feeds power contactlessly to the conductor 52 by electromagnetic coupling. Consequently, it is possible to achieve the feeding structure 213 that is simple and that is capable of feeding power, even when the interlayer 32 and the dielectric plate 20 are interposed between the conductor 52 and the feeding portion 45, to the conductor 52 present between the pair of dielectric plates 10 and 20. In FIG. 3, the distance that enables electromagnetic coupling is substantially equal to the sum of the thickness of the interlayer 32 in the Z-axis direction and the thickness of the dielectric plate 20 in the Z-axis direction.

Figure 4:
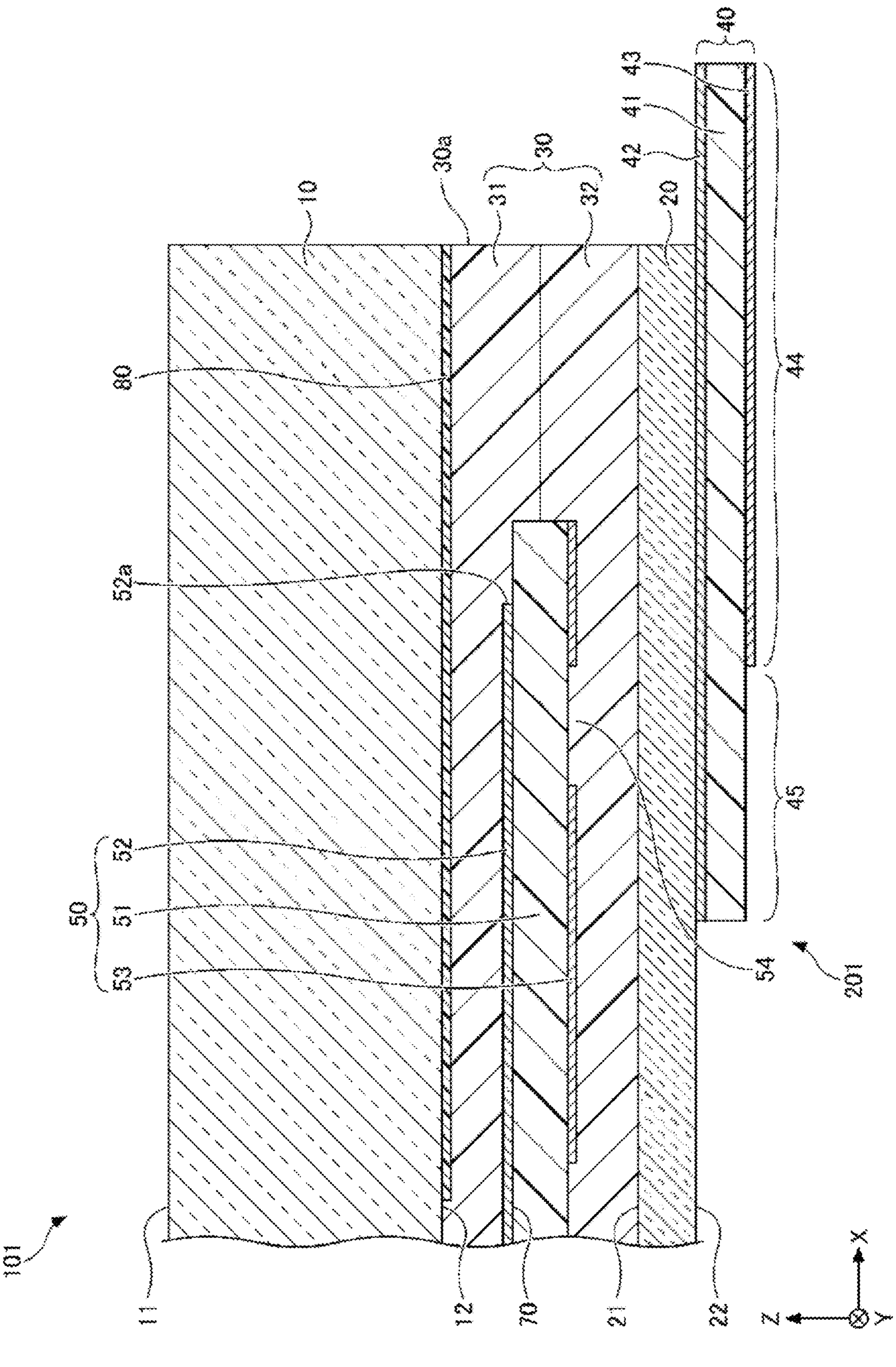
FIG. 4 is partial cross sectional view illustrating an example of the configuration of a plate-shaped body including a feeding structure in a fourth embodiment.

FIG. 4 is a partial cross sectional view illustrating an example of the configuration of a plate-shaped body including a feeding structure in a fourth embodiment. Description of the components, actions and effects in the fourth embodiment similar to those in the embodiments described above is omitted or simplified by citing the description of the embodiments described above. A plate-shaped body 101 illustrated in FIG. 4 includes a feeding structure 201 that feeds power to the conductor 52 of a transmission line 50 present between the pair of dielectric plates 10 and 20.

The plate-shaped body 101 is a layered body that includes the pair of dielectric plates 10 and 20, the interlayer 30, and the transmission line 50. The feeding structure 201 shares, with the plate-shaped body 101, the pair of dielectric plates 10 and 20, the interlayer 30, and the transmission line 50. The feeding structure 201 includes the pair of dielectric plates 10 and 20, the interlayer 30, the transmission line 50, the feeding portion 45, and the transmission line 44.

The interlayer 30 includes the interlayer 31 and the interlayer 32. The interlayer 31 is an example of the first interlayer and is interposed between the dielectric plate 10 and the transmission line 50. The interlayer 32 is an example of the second interlayer and is interposed between the dielectric plate 20 and the transmission line 50.

The transmission line 50 is an example of a second transmission line and is disposed to be sandwiched between the interlayer 31 and the interlayer 32. The transmission line 50 has a dielectric layer 51 that contains a dielectric as a main component, the conductor 52 that is formed at a surface on the positive side in the Z-axis direction of the dielectric layer 51, and a ground layer 53 that is formed at a surface on the negative side in the Z-axis direction of the dielectric layer 51. The conductor 52 is a signal line of the transmission line 50.

The transmission line 50 transmits a high-frequency signal. One end portion of the transmission line 50 faces the feeding portion 45 in the Z-axis direction. The other end portion of the transmission line 50 is electrically connected to the antenna 70. In this example, the conductor 52 of the transmission line 50 is fed from the feeding portion 45 through a slot 54 formed in the ground layer 53.

The antenna 70 is a linear or planar conductor disposed between the pair of dielectric plates 10 and 20 and is connected at the other end portion of the transmission line 50 to the conductor 52 in the same layer. The antenna 70 transmits and receives radio waves to and from the outside of the plate-shaped body 101. The antenna 70 may be transparent or translucent. When the antenna 70 is transparent, the antenna 70 is not easily visually recognized in a configuration in which the plate-shaped body is used as a window glass for a vehicle. In particular, when the plate-shaped body 101 (window glass for a vehicle) has the light-shielding film 80 described in the first embodiment, the antenna 70 is not easily visually recognized by an occupant, if the antenna is transparent, even when being disposed at an opening (transmission region inside the inner edge of the light-shielding film 80) separated from an end portion of the plate-shaped body 101.

The feeding portion 45 electromagnetically couples to the conductor 52 with a gap smaller than the thickness of the dielectric plate 10 in the Z-axis direction and feeds power contactlessly to the conductor 52 by electromagnetic coupling. Consequently, it is possible to achieve the feeding structure 201 that is simple and that is capable of feeding power, even when the dielectric layer 51, the interlayer 32, and the dielectric plate 20 are interposed between the conductor 52 and the feeding portion 45, to the conductor 52 present between the pair of dielectric plates 10 and 20. In FIG. 4, the distance that enables electromagnetic coupling is substantially equal to the sum of the thickness of the dielectric layer 51 in the Z-axis direction, the thickness of the interlayer 32 in the Z-axis direction, and the thickness of the dielectric plate 20 in the Z-axis direction.

Figure 5:
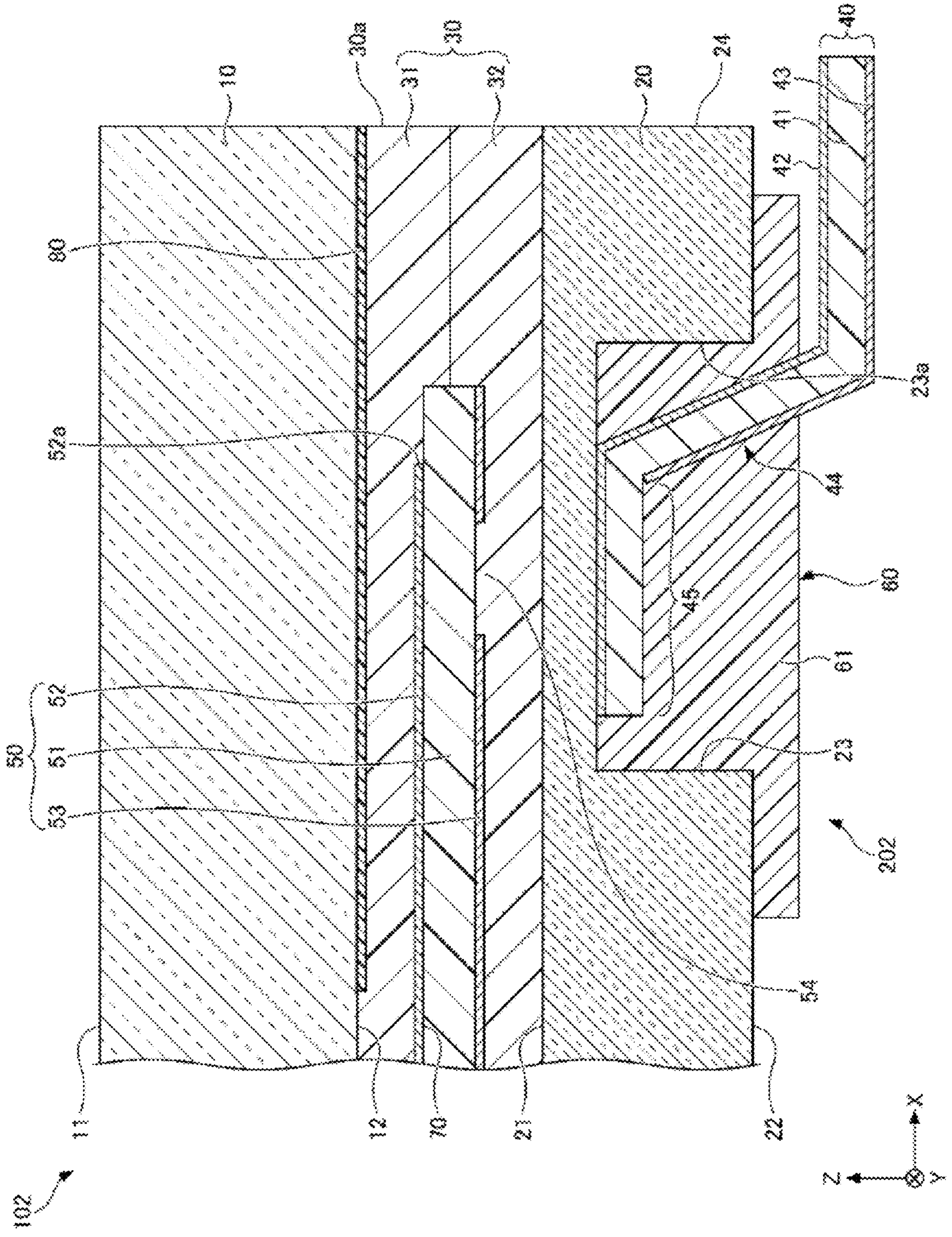
FIG. 5 is a partial cross sectional view illustrating an example of the configuration of a plate-shaped body including a feeding structure in a fifth embodiment.

FIG. 5 is a partial cross sectional view illustrating an example of the configuration of a plate-shaped body including a feeding structure in a fifth embodiment. Description of the components, actions and effects in the fifth embodiment similar to those in the embodiments described above is omitted or simplified by citing the description of the embodiments described above. A plate-shaped body 102 illustrated in FIG. 5 includes a feeding structure 202 that feeds power to the conductor 52 of the transmission line 50 present between the pair of dielectric plates 10 and 20.

In FIG. 5, an example in which the dielectric plate 20 has a recessed portion 23 is illustrated. In this example, the recessed portion 23 is a hole that is formed, at the dielectric plate 20, as an opening hollowed toward the positive side in the Z-axis direction with respect to the main surface 22 and that does not extend through the dielectric plate 20. The feeding portion 45 is disposed in the recessed portion 23. Consequently, even when the dielectric plate 20 is relatively thick in the Z-axis direction, a distance that enables electromagnetic coupling between the feeding portion 45 and the conductor 52 can be ensured due to the feeding portion 45 being located in the recessed portion 23. It is thus possible to achieve the feeding structure 202 that is simple and that is capable of feeding power to the conductor 52 present between the pair of dielectric plates 10 and 20.

When the plate-shaped body 102 is a window glass for a vehicle, a glass composition of the glass plate 10 (dielectric plate 10) and a glass composition of the glass plate 20 (dielectric plate 20) may be the same, as with the plate-shaped body 111 in the first embodiment. Further, the thickness of the glass plate 10 and the thickness of the glass plate 20 may be the same. The thickness of the glass plate 10 and the thickness of the glass plate 20 may, for example, be a thickness of 2.0 mm. In this case, the glass plate 20 (excluding the recessed portion 23) can be made thick, and the glass plate 20 is thus not necessarily the tempered glass described above.

It is preferable that a side surface 23*a* of the recessed portion 23 is separated from an end 24 of the dielectric plate 20 by a distance of 5 mm or more toward the inner side (the negative side in the X-axis direction in this example) in a plan view of the dielectric plate 20 in the Z-axis direction. Consequently, it is possible, even when the recessed portion 23 is present, to ensure the strength of the dielectric plate 20 at a portion between the side surface 23*a* and the end 24. An upper limit value of the distance by which the side surface 23*a* is separated from the end 24 toward the inner side may be set, as appropriate, in accordance with specifications and the like of a product in which the plate-shaped body 102 is to be used.

The recessed portion 23 may be an opening that is hollowed toward the negative side in the X-axis direction with respect to the end 24 extending in the Y-axis direction. While being not particularly illustrated, this recessed portion 23 has a form in which a portion between the side surface 23*a* and the end 24 in the dielectric plate 20 is not present.

The recessed portion 23 may be sealed by a sealing portion 60. Consequently, the feeding portion 45 is sealed together with the recessed portion 23 by the sealing portion 60, and it is thus possible to suppress a change in the distance that enables electromagnetic coupling between the feeding portion 45 and the conductor 52. The sealing portion 60 is formed by, for example, a dielectric 61 made of a molded resin or the like. Examples of the resin material used in the sealing portion 60 include a photocurable resin, such as an ultraviolet-curable resin, and a heat-curable resin. When a photocurable resin is used, instantaneous bonding (curing) can be performed by irradiation of light, such as ultraviolet light, and it is thus possible to shorten a work time. When a heat-curable resin is used, crosslink density can be increased by adjusting the type and the ratio of the material contained in the resin, and it is thus possible to improve heat resistance, chemical resistance, and moisture resistance of the sealing portion 60 after curing.

The sealing portion 60 may be a terminal component that accommodates the feeding portion 45. When the sealing portion 60 is such a terminal component, the terminal component (sealing portion 60) to which the transmission line 44 is connected is fitted to the recessed portion 23 thereby to fix the feeding portion 45 to the conductor 52 with a distance that enables electromagnetic coupling.

The transmission line 44 includes a flexible portion that is bendable in the recessed portion 23. Consequently, the transmission line 44 is disposed in the recessed portion 23 to include a curved surface, as illustrated. Therefore, even in a form in which the feeding portion 45 is disposed in the recessed portion 23, stress is less likely to be placed on a connection part between the feeding portion 45 and the transmission line 44. When the substrate 40 is a flexible substrate, the transmission line 44 is easily bent in the recessed portion 23, and stress is less likely to be placed on the connection part between the feeding portion 45 and the transmission line 44.

The feeding portion 45 may be a member that includes a rigid substrate that is harder than the flexible portion of the transmission line 44. The feeding portion 45 that includes the hard rigid substrate can suppress a change in the distance that enables electromagnetic coupling between the feeding portion 45 and the conductor 52.

Figure 6:
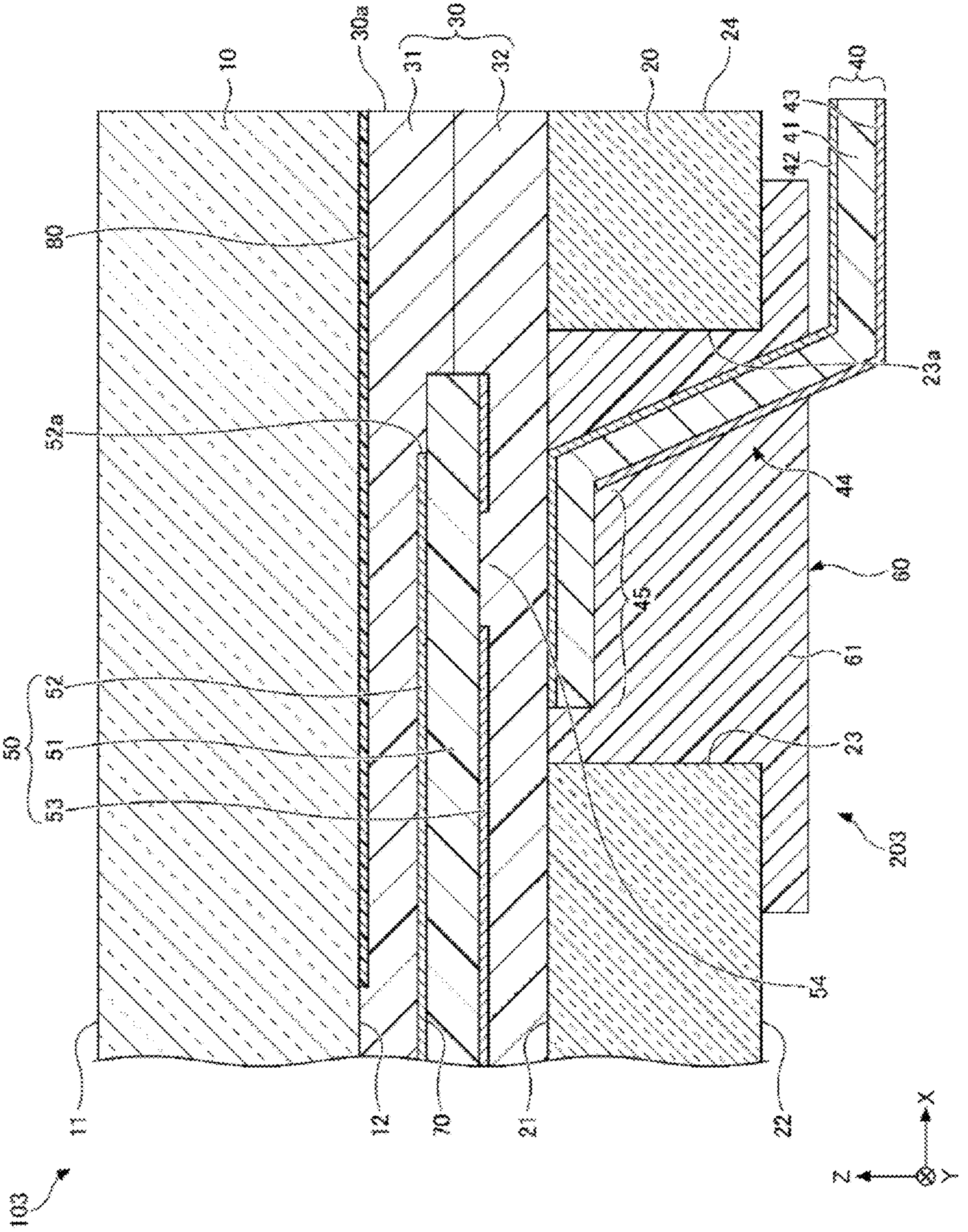
FIG. 6 is a partial cross sectional view illustrating an example of the configuration of a plate-shaped body including a feeding structure in a sixth embodiment.

FIG. 6 is a partial cross sectional view illustrating an example of the configuration of a plate-shaped body including a feeding structure in a sixth embodiment. Description of the components, actions and effects in the sixth embodiment similar to those in the embodiments described above is omitted or simplified by citing the description of the embodiments described above. A plate-shaped body 103 illustrated in FIG. 6 includes a feeding structure 203 that feeds power to the conductor 52 of the transmission line 50 present between the pair of dielectric plates 10 and 20.

FIG. 6 illustrates an example which includes a portion where the recessed portion 23 extends through the dielectric plate 20. In this example, the recessed portion 23 is a hole that is formed, at the dielectric plate 20, as an opening hollowed toward the positive side in the Z-axis direction with respect to the main surface 22 and that extends through the dielectric plate 20. The feeding portion 45 is disposed in the recessed portion 23. Consequently, even when the dielectric plate 20 is relatively thick in the Z-axis direction, a distance that enables electromagnetic coupling between the feeding portion 45 and the conductor 52 can be ensured due to the feeding portion 45 being located in the recessed portion 23. It is thus possible to achieve the feeding structure 203 that is simple and that is capable of feeding power to the conductor 52 present between the pair of dielectric plates 10 and 20.

In FIG. 6, the facing conductor of the feeding portion 45 is in contact with the interlayer 32. Therefore, the distance that enables electromagnetic coupling is substantially equal to the sum of the thickness of the dielectric layer 51 in the Z-axis direction and the thickness of the interlayer 32 in the Z-axis direction. A material, such as a resin, used in the sealing portion 60 is preferably the same as the resin in the interlayer 32 since the linear expansion coefficients thereof can be equal to each other, thermal cracking and the like are less likely to occur, and durability will improve. When a material used in the sealing portion 60 differs from the material (resin) of the interlayer 32, a combination of the sealing portion 60 and the interlayer 32 with a small difference in linear expansion coefficient in a use temperature range (for example −40° C. to 90° C.) is preferable from the point of view of durability.

Figure 7:
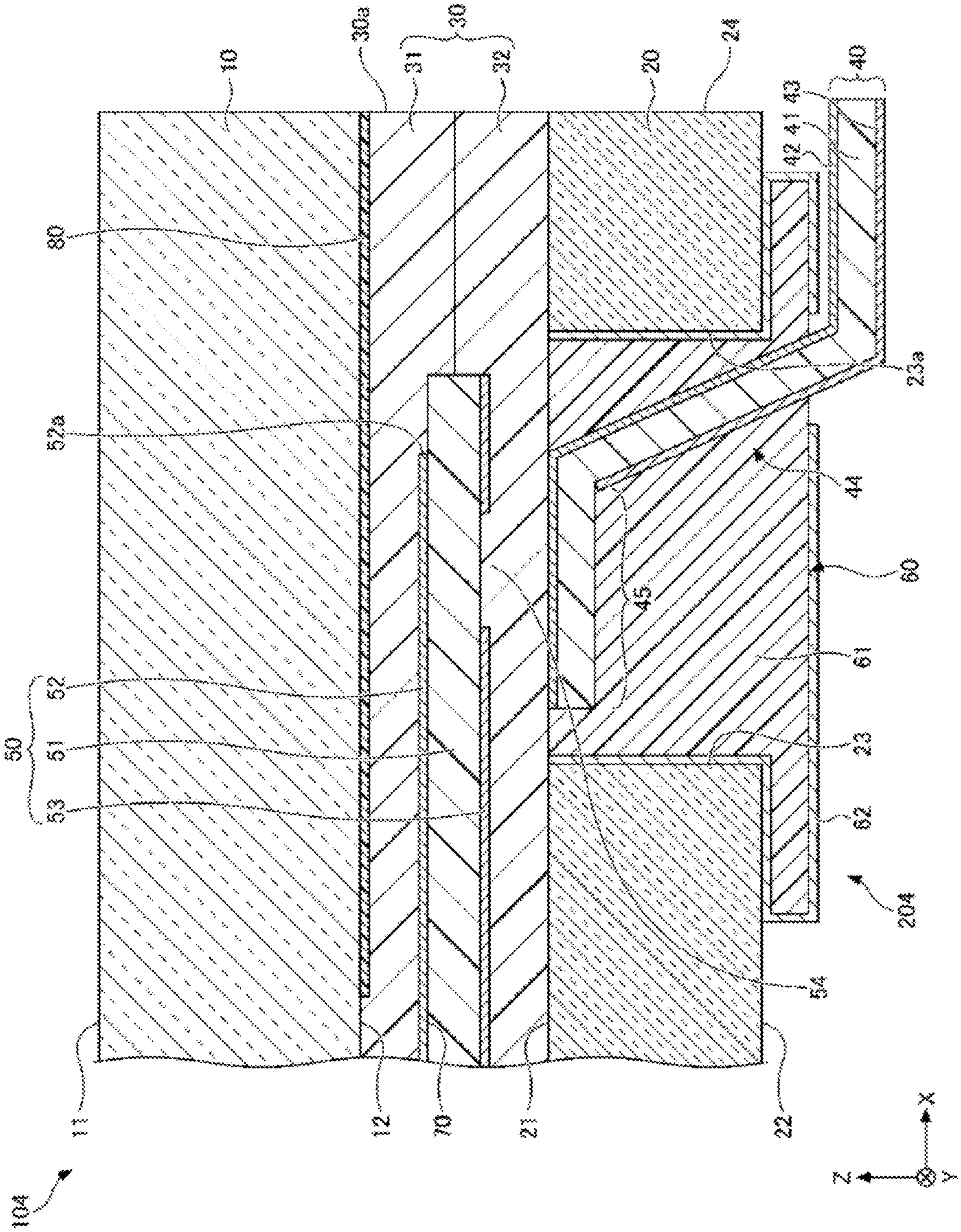
FIG. 7 is a partial cross sectional view illustrating an example of the configuration of a plate-shaped body including a feeding structure in a seventh embodiment.

FIG. 7 is a partial cross sectional view illustrating an example of the configuration of a plate-shaped body including a feeding structure in a seventh embodiment. Description of the components, actions and effects in the seventh embodiment similar to those in the embodiments described above is omitted or simplified by citing the description of the embodiments described above. A plate-shaped body 104 illustrated in FIG. 7 includes a feeding structure 204 that feeds power to the conductor 52 of the transmission line 50 present between the pair of dielectric plates 10 and 20.

FIG. 7 illustrates an example in which the sealing portion 60 includes a shield 62 that blocks electromagnetic waves. The shield 62 is provided at a portion of the sealing portion 60 excluding the feeding portion 45. The shield 62 is in contact with the dielectric 61. The shield 62 is, for example, formed to cover the dielectric 61. Examples of the shield 62 include a metal film, such as a silver film and a metal oxide film, such as an ITO (indium tin oxide) film. With the sealing portion 60 including the shield 62, electromagnetic waves radiated from the feeding portion 45 are blocked by the shield 62. Therefore, electromagnetic coupling between the feeding portion 45 and the conductor 52 is strengthened, and a loss due to contactless feeding is suppressed.

The shield 62 may be in contact with the ground layer 43 of the transmission line 44 but is separated in FIG. 7 from the ground layer 43. Consequently, propagation of noise to the transmission line 44 can be suppressed.

Figure 8:
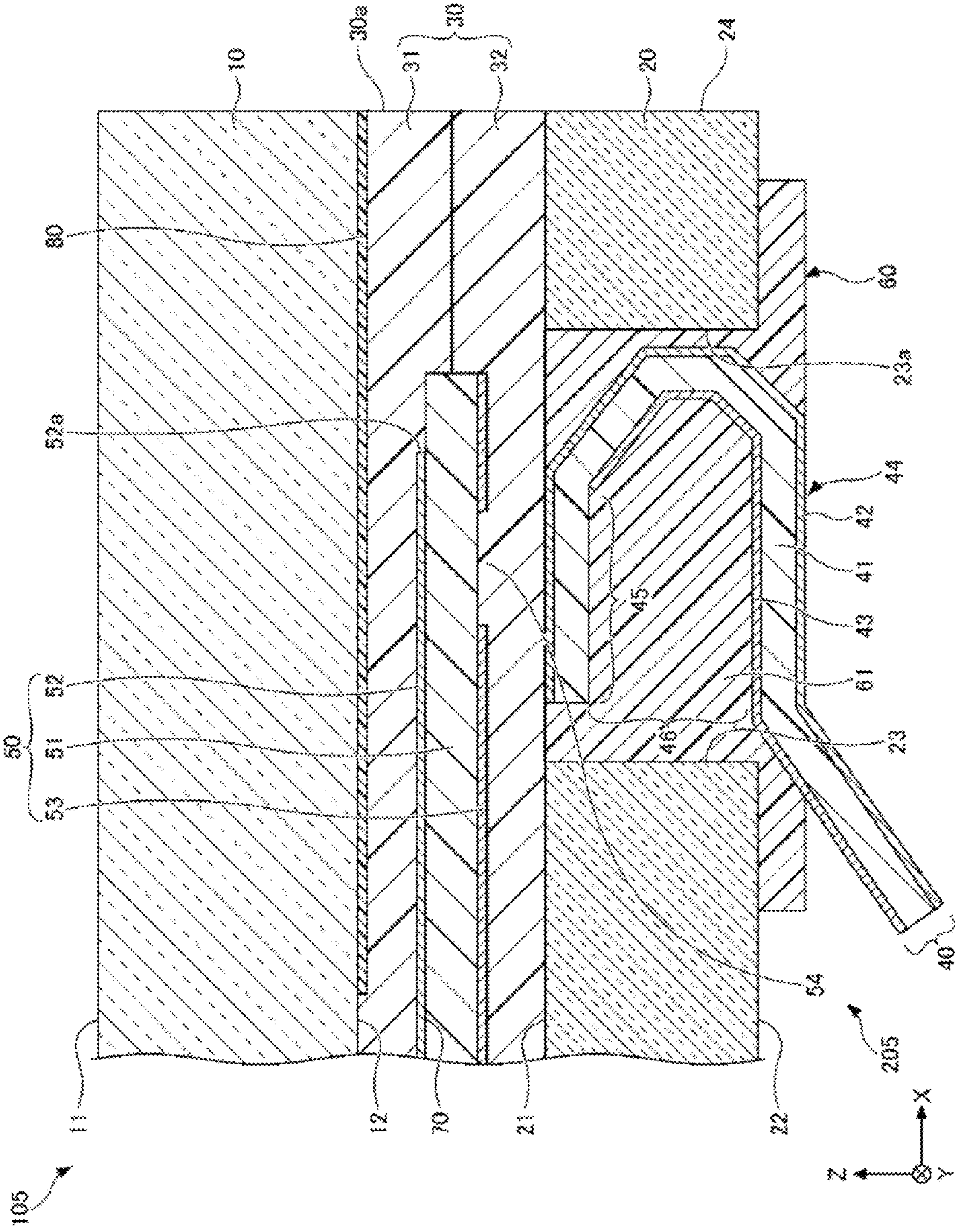
FIG. 8 is a partial cross sectional view illustrating an example of the configuration of a plate-shaped body including a feeding structure in an eighth embodiment.

FIG. 8 is a partial cross sectional view illustrating an example of the configuration of a plate-shaped body including a feeding structure in an eighth embodiment. Description of the components, actions and effects in the eighth embodiment similar to those in the embodiments described above is omitted or simplified by citing the description of the embodiments described above. A plate-shaped body 105 illustrated in FIG. 8 includes a feeding structure 205 that feeds power to the conductor 52 of the transmission line 50 present between the pair of dielectric plates 10 and 20.

FIG. 8 illustrates an example which includes a portion where the transmission line 44 is folded back in a direction substantially orthogonal to the thickness direction of the dielectric plate 20 (referred to as an open portion 46). The open portion 46 illustrated in FIG. 8 is a U-shaped or J-shaped portion that is folded back in a direction substantially orthogonal to the thickness direction of the dielectric plate 20 (toward the negative side in the X-axis direction in this example). With the transmission line 44 including such an open portion 46, electromagnetic waves radiated from the feeding portion 45 are blocked by the ground layer 43. Therefore, electromagnetic coupling between the feeding portion 45 and the conductor 52 is strengthened, and a loss due to contactless feeding is suppressed. The structure of the transmission line 44 may be an electromagnetic band gap structure that blocks electromagnetic waves.

Figure 9:
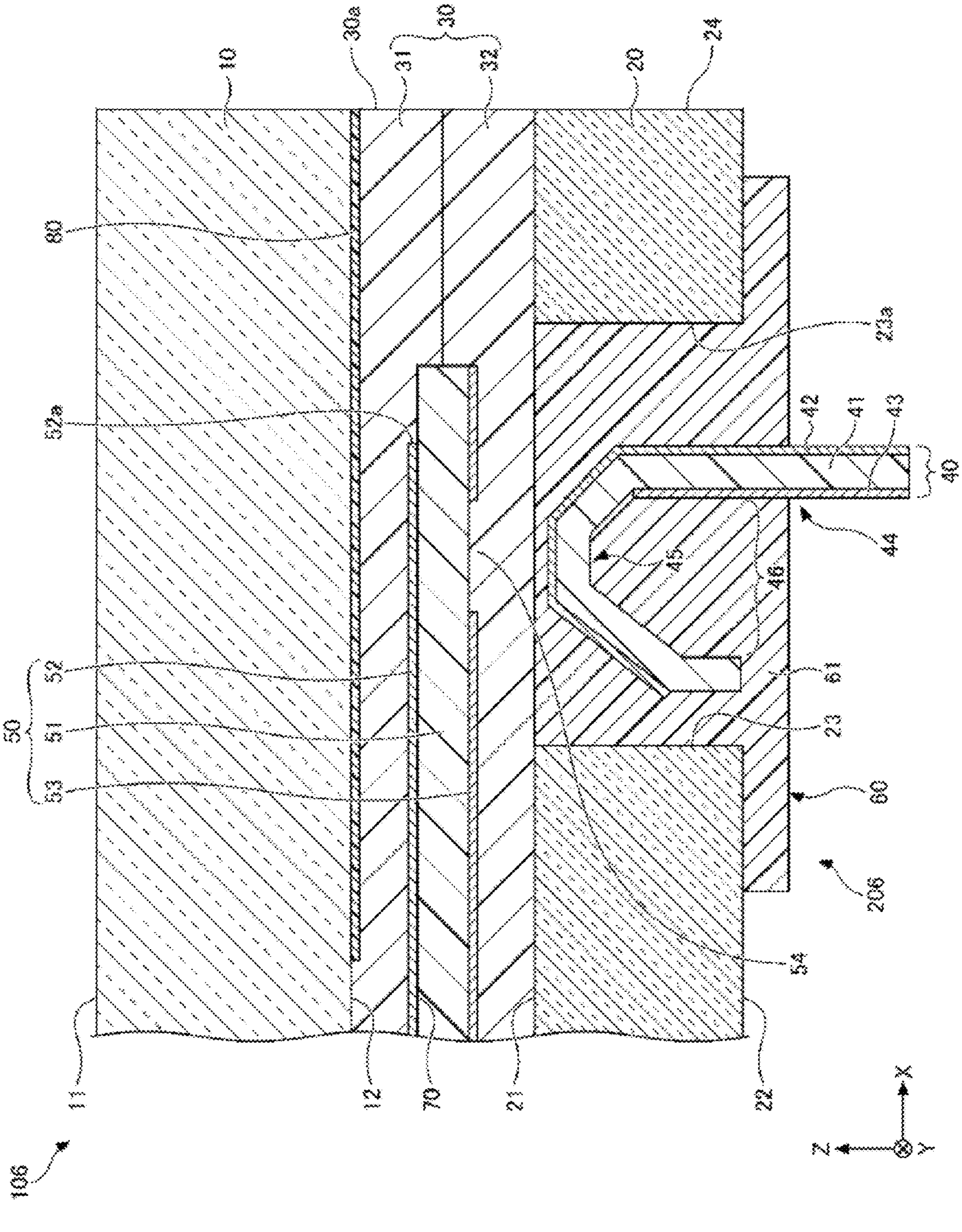
FIG. 9 is a partial cross sectional view illustrating an example of the configuration of a plate-shaped body including a feeding structure in a ninth embodiment.

FIG. 9 is a partial cross sectional view illustrating an example of the configuration of a plate-shaped body including a feeding structure in a ninth embodiment. Description of the components, actions and effects in the ninth embodiment similar to those in the embodiments described above is omitted or simplified by citing the above description. A plate-shaped body 106 illustrated in FIG. 9 includes a feeding structure 206 that feeds power to the conductor 52 of the transmission line 50 present between the pair of dielectric plates 10 and 20.

FIG. 9 illustrates an example which includes a portion where the feeding portion 45 is folded back in a direction substantially parallel to the thickness direction of the dielectric plate 20 (referred to as the open portion 46). The open portion 46 illustrated in FIG. 9 is a U-shaped or J-shaped portion that is folded back in a direction substantially parallel to the thickness direction of the dielectric plate 20 (toward the negative side in the Z-axis direction in this example). With the feeding portion 45 including such an open portion 46, the transmission line 44 can be disposed along a direction substantially parallel to the thickness direction of the dielectric plate 20. Consequently, it is possible, even in a surrounding environment in which, for example, it is difficult to dispose the transmission line 44 that extends in a direction substantially orthogonal to the thickness direction of the dielectric plate 20 (for example, the X-axis direction), to ensure a space in which the transmission line 44 extends.

Figure 10:
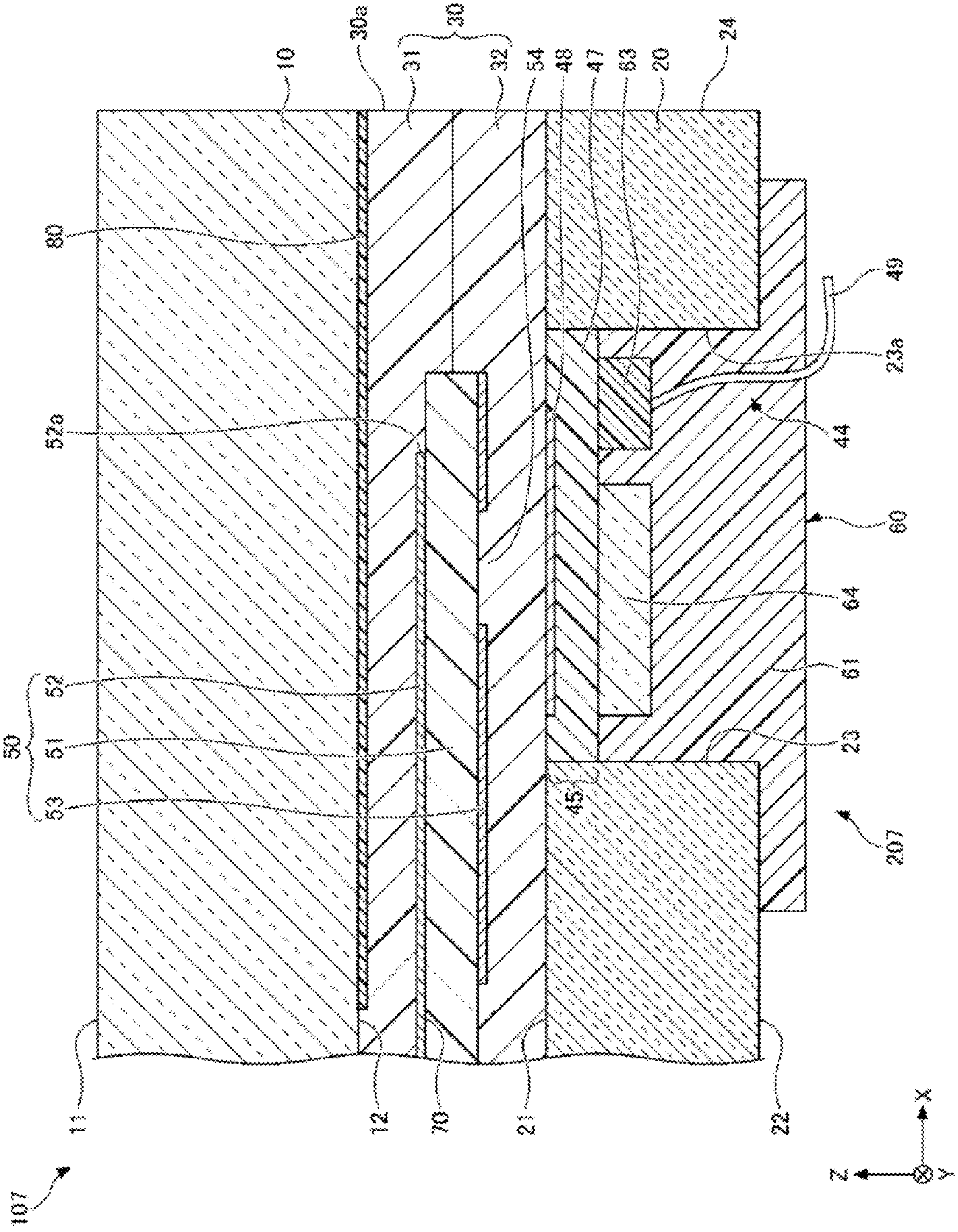
FIG. 10 is a partial cross sectional view illustrating an example of the configuration of a plate-shaped body including a feeding structure in a tenth embodiment.

FIG. 10 is a partial cross sectional view illustrating an example of the configuration of a plate-shaped body including a feeding structure in a tenth embodiment. Description of the components, actions and effects in the tenth embodiment similar to those in the embodiments described above is omitted or simplified by citing the description of the embodiments described above. A plate-shaped body 107 illustrated in FIG. 10 includes a feeding structure 207 that feeds power to the conductor 52 of the transmission line 50 present between the pair of dielectric plates 10 and 20.

FIG. 10 illustrates an example in which the transmission line 44 includes a transmission cable 49. The feeding portion 45 includes a rigid substrate 47 on which a connector 63 to which one end of the transmission cable 49 is connected is mounted. Consequently, connection between the transmission cable 49 and the feeding portion becomes easy. The other end of the transmission cable 49 is, for example, electrically connected to a communication device, which is not illustrated. The transmission cable 49 is, for example, a coaxial cable. The rigid substrate 47 is, for example, an interposer substrate.

The feeding portion 45 may include an active element 64 mounted on the rigid substrate 47. With the feeding portion 45 including the rigid substrate 47, the active element 64 is easily provided at the feeding portion 45. In the example illustrated in FIG. 10, the rigid substrate 47 has a surface on which a feeding pad 48 facing the conductor 52 is formed and a surface on which the active element 64 and the connector 63 are mounted. The feeding pad 48 is connected to the transmission cable 49 through the active element 64. The feeding pad 48 electromagnetically couples to the conductor 52 and feeds power to the conductor 52 by electromagnetic coupling.

The active element 64 is, for example, a RF (high frequency) device, such as a power amplifier, a mixer, a phase shifter and a switch, and a RF circuit in which RF devices are combined. For example, the active element 64 supplies to the transmission cable 49 a low-frequency signal that is obtained by down-converting a high-frequency signal that flows in the feeding pad 48. Alternatively, the active element 64 supplies to the feeding pad 48 a high-frequency signal that is obtained by up-converting a low-frequency signal that flows in the transmission cable 49.

Figure 11:
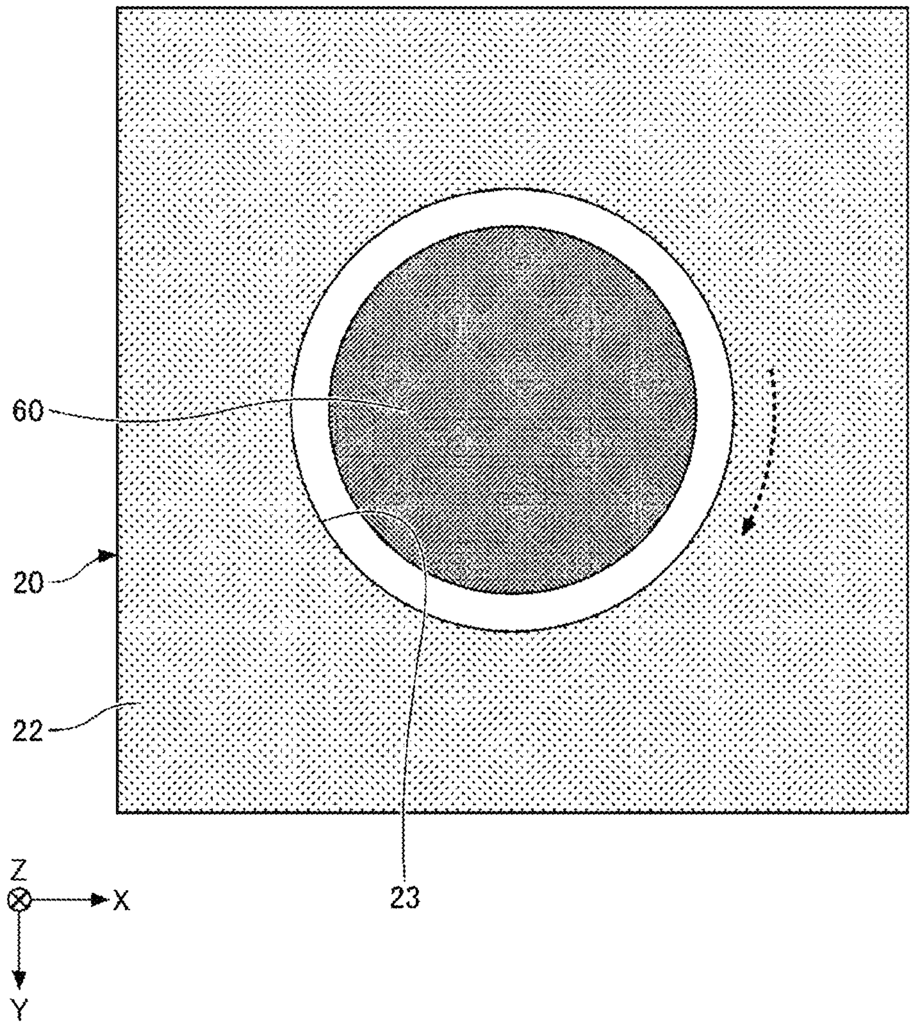
FIG. 11 is a plan view illustrating a first example of the configuration of a recessed portion in the feeding structure in the fifth to tenth embodiments.

FIG. 11 is a plan view illustrating a first example of the configuration of a recessed portion in the feeding structure in the fifth to tenth embodiments. The recessed portion 23 illustrated in FIG. 11 has a circular opening. With the recessed portion 23 having the circular opening, when the sealing portion 60 is an add-on component that is to be fitted to the recessed portion 23, fitting of the sealing portion 60 to the recessed portion 23 is easy.

Figure 12:
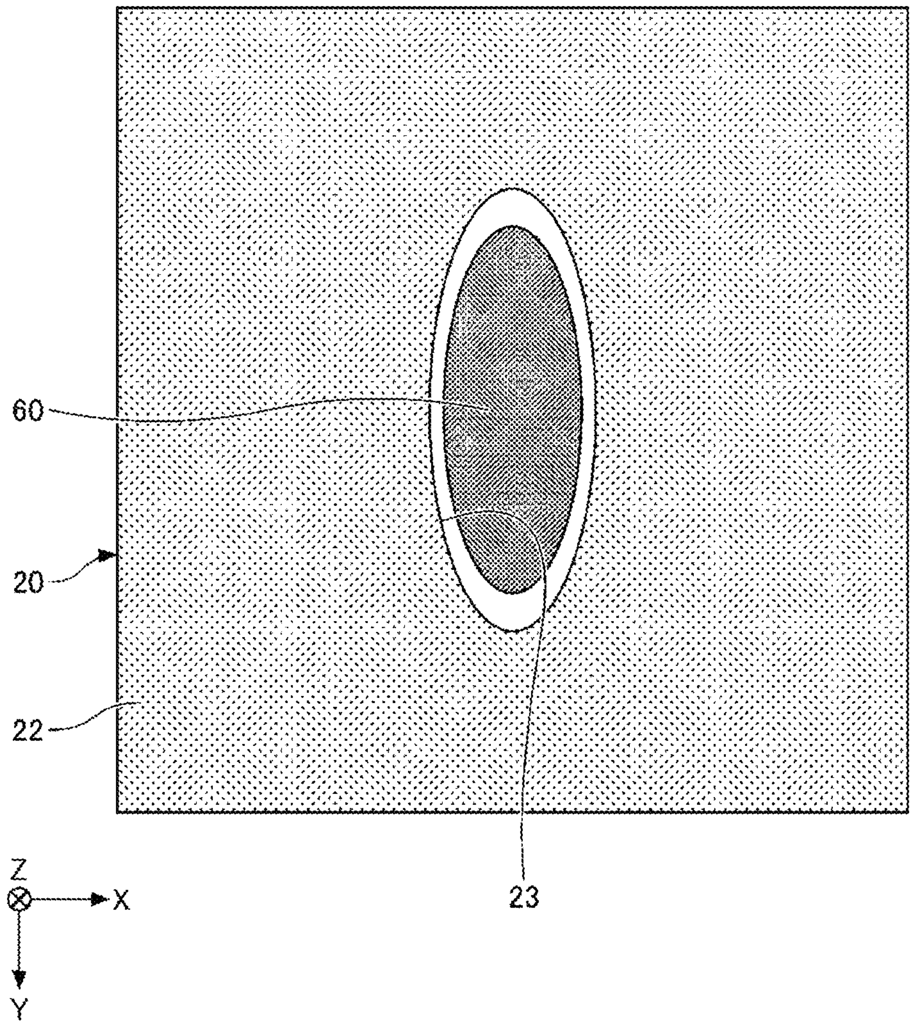
FIG. 12 is a plan view illustrating a second example of the configuration of a recessed portion in the feeding structure in the fifth to tenth embodiments.

FIG. 12 is a plan view illustrating a second example of the configuration of a recessed portion in the feeding structure in the fifth to tenth embodiments. The recessed portion 23 illustrated in FIG. 12 has a shape (an ellipse in this case) that is not rotationally symmetrical in a rotation range of ±45° in a plan view of the dielectric plate 20.

Figure 13:
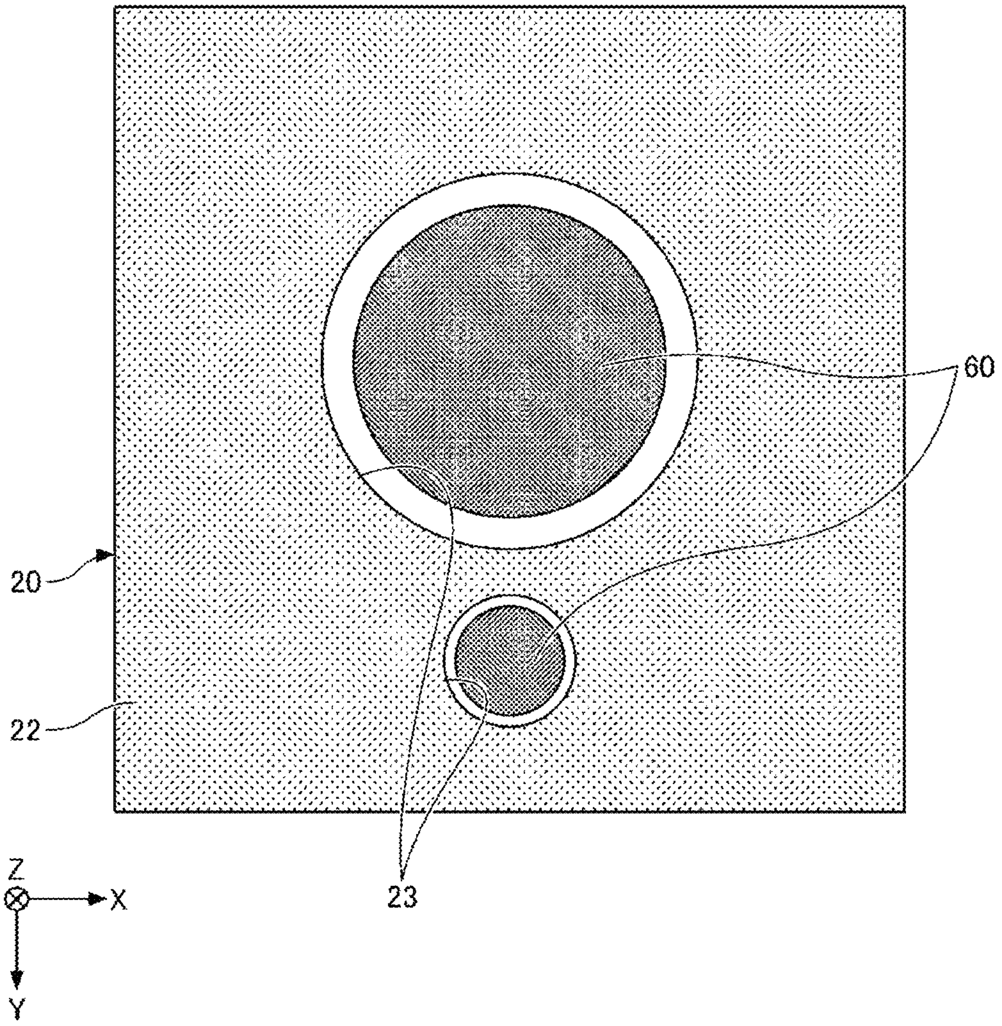
FIG. 13 is a plan view illustrating a third example of the configuration of a recessed portion in the feeding structure in the fifth to tenth embodiments.

FIG. 13 is a plan view illustrating a third example of the configuration of a recessed portion in the feeding structure in the fifth to tenth embodiments. The recessed portion 23 illustrated in FIG. 13 has a shape (a plurality of circles that are not in contact with each other in this case) that is not rotationally symmetrical in a rotation range of ±45° in a plan view of the dielectric plate 20.

In other words, the recessed portion 23 illustrated in FIG. 12 and FIG. 13 has a shape that does not overlap itself even when being rotated about the center of gravity of the recessed portion 23 in a rotation range of ±45° in a plan view of the dielectric plate 20. With the recessed portion 23 having such a shape, the rotation of the sealing portion 60 inside the recessed portion 23 is suppressed, and differences in the strength of electromagnetic coupling among individuals are reduced. Consequently, variations in feeding performance among products are suppressed.

The shape that is not rotationally symmetrical in a rotation range of ±45° is not limited to an ellipse and may be another shape, such as a triangular shape and a quadrangular shape.

While the first to tenth embodiments have been described above, the technology according to the present disclosure is not limited to the aforementioned embodiments. Various modifications and improvements including combinations and replacement with part or entirety of other embodiments are possible.

For example, the plate-shaped body in the first to tenth embodiments is not limited to a window glass and may be another plate-shaped body such as a display panel. In addition, the plate-shaped body and the window glass in the first to tenth embodiments are not limited to be for use in a vehicle and may be for use in other applications, such use in a building or an electronic device. Examples of the electronic device include portable devices including a smartphone, a portable telephone, a tablet computer, and the like.

REFERENCE SYMBOLS

10 dielectric plate
11, 12 main surface
20 dielectric plate
21, 22 main surface
23 recessed portion
23*a* side surface
24 end
30, 31, 32 interlayer
30*a* end portion
40 substrate
41 dielectric layer
42 signal line
43 ground layer
44 transmission line
45 feeding portion
46 open portion
47 rigid substrate
48 feeding pad
49 transmission cable
50 transmission line
51 dielectric layer
52 conductor
52*a* end portion
53 ground layer
54 slot
60 sealing portion
61 dielectric
62 shield
63 connector
64 active element
70 antenna
80 light-shielding film
101 to 107, 111, 112, 113 plate-shaped body
201 to 207, 211, 212, 213 feeding structure

What is claimed is:

1. A feeding structure comprising:
a first dielectric plate;
a second dielectric plate that faces the first dielectric plate;
an interlayer that is disposed between the first dielectric plate and the second dielectric plate;
a conductor that is disposed between the first dielectric plate and the second dielectric plate;
a feeding portion that is disposed on a side opposite of the interlayer from the first dielectric plate and that sandwiches at least one of a portion of the interlayer and a portion of the second dielectric plate between the conductor and the feeding portion;
a first transmission line that is connected to the feeding portion; and
a second transmission line,
wherein the feeding portion electromagnetically couples to the conductor with a gap smaller than a thickness of the first dielectric plate, and
the conductor is a signal line of the second transmission line.

2. The feeding structure according to claim 1,
wherein the interlayer includes a first interlayer and a second interlayer, and
wherein the conductor is disposed between the first interlayer and the second interlayer.

3. The feeding structure according to claim 1,
wherein an end portion of the conductor is located inside an end portion of the interlayer.

4. The feeding structure according to claim 1,
wherein the second dielectric plate has a recessed portion, and
wherein the feeding portion is disposed in the recessed portion.

5. The feeding structure according to claim 4,
wherein a portion where the recessed portion extends through the second dielectric plate is included.

6. The feeding structure according to claim 5,
wherein the feeding portion is in contact with the interlayer.

7. The feeding structure according to claim 4,
wherein the recessed portion is sealed by a sealing portion.

8. The feeding structure according to claim 7,
wherein the sealing portion includes
a shield that is provided at a portion excluding the feeding portion and that blocks electromagnetic waves, and
a dielectric that is in contact with the shield.

9. The feeding structure according to claim 8,
wherein the first transmission line includes a ground layer, and
wherein the shield is separated from the ground layer.

10. The feeding structure according to claim 4,
wherein a side surface of the recessed portion is separated from an end of the second dielectric plate by 5 mm or more in a plan view of the second dielectric plate.

11. The feeding structure according to claim 4, wherein the first transmission line includes a flexible portion that is bendable in the recessed portion.

12. The feeding structure according to claim 11, wherein the feeding portion includes a rigid substrate that is harder than the flexible portion.

13. The feeding structure according to claim 11, wherein a portion where the first transmission line is folded back in a direction substantially orthogonal to a thickness direction of the second dielectric plate is included.

14. The feeding structure according to claim 11, wherein a portion where the feeding portion is folded back in a direction substantially parallel to a thickness direction of the second dielectric plate is included.

15. The feeding structure according to claim 4, wherein the first transmission line includes a transmission cable, and wherein the feeding portion includes a rigid substrate on which a connector to which one end of the transmission cable is connected is mounted.

16. The feeding structure according to claim 15, wherein the feeding portion includes an active element that is mounted on the rigid substrate.

17. The feeding structure according to claim 4, wherein the recessed portion has a shape that is not rotationally symmetrical in a rotation range of ±45° in a plan view of the second dielectric plate.

18. The feeding structure according to claim 1, comprising:

an antenna that is disposed between the first dielectric plate and the second dielectric plate and that is electrically connected to the second transmission line.

19. The feeding structure according to claim 1, wherein one or both of the first dielectric plate and the second dielectric plate are each a glass plate.

* * * * *